Feb. 7, 1928. Re. 16,871

P. JOHNSON

FLUID FUEL BURNER

Original Filed Nov. 17, 1924

INVENTOR
Peter Johnson
BY
Frank Warren
ATTORNEY

Reissued Feb. 7, 1928. Re. 16,871

UNITED STATES PATENT OFFICE.

PETER JOHNSON, OF SEATTLE, WASHINGTON.

FLUID-FUEL BURNER.

Original No. 1,542,142, dated June 16, 1925, Serial No. 750,279, filed November 17, 1924. Application for reissue filed July 12, 1927. Serial No. 205,246.

My invention relates to improvements in fluid fuel burners of the type used in domestic cooking stoves and the object of my invention is to provide a fluid fuel burner that embodies means that will prevent the flooding of the interior or body portion of the burner and fire box of the stove with fluid fuel if such fuel is not in a gaseous state.

The fluid fuel burners now in common use are constructed in such a manner that when the fluid fuel is not gasified the fuel passes within the body portion of the burner and into the fire box where it becomes lighted and burns causing the burner, fire box and flues to become coated with soot and also causing a great amount of smoke while in my burner all these objectionable features are eliminated by providing a fluid fuel conduit within the burner body at a slight upward incline with respect to the horizontal which conduit is also provided on its discharge end with a well or shallow receptacle arranged to catch the fluid fuel and prevent the same from being discharged into the burner body that angle at which the conduit being such that the fluid fuel will flow back into the ash pit of the stove.

I accomplish these objects by devices illustrated in the accompanying drawings, wherein—

Referring to the drawings throughout which like reference numerals indicate like parts, 5 designates a burner body which is herein shown to be rectangular shape.

Figure 1:
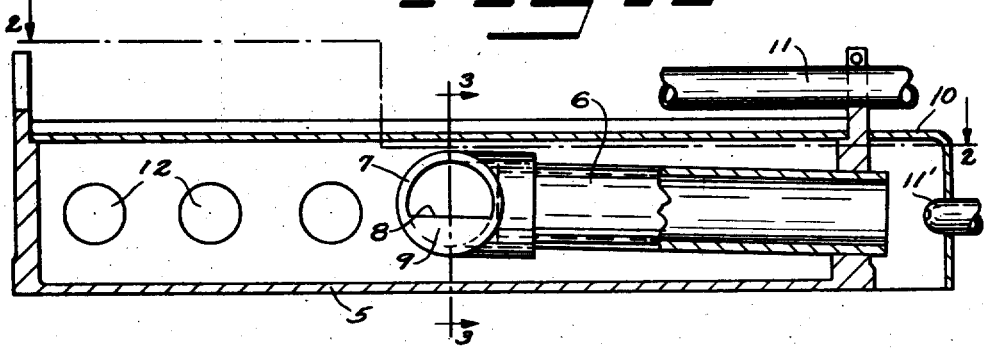
Figure 1 is a view in longitudinal section showing one form of burner having fuel inlet means constructed in accordance with my invention.
Figure 2:
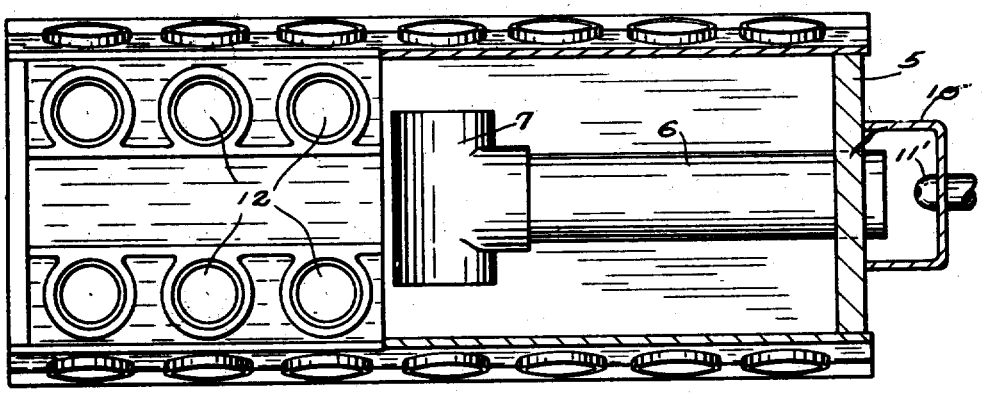
Fig. 2 is a view partly in plan and partly in horizontal section taken on line 2, 2 of Fig. 1.
Figure 3:
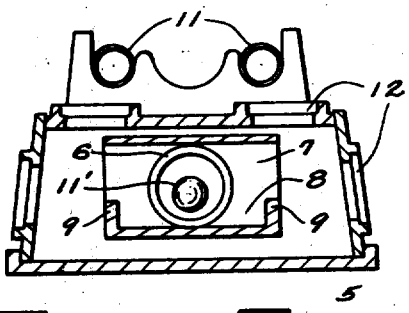
Fig. 3 is a view in cross section on line 3, 3 of Fig. 1.

My invention consists in the provision within the burner body 5 of a fuel inlet conduit 6 which enters the burner body on an upward inclination with respect to the horizontal and which terminates in means 7 forming a well 8 in which oil may collect and from which it will flow backwardly along the conduit and out of the outer end thereof instead of being discharged within the body of the burner.

The means 7 forming the well 8 that is illustrated in the drawings is in the nature of a T-fitting connected with and extending crosswise of the conduit 6 in a horizontal position and open at both ends and is provided across the lower segmental portion of both ends with webs or dams 9 which cooperate in forming the well 8. It will be understood that the well forming member 7 and also the conduit 6 may be integral with the body portion of the burner if desired and may be varied in shape to suit the requirements of the burner body into which it is incorporated.

The outer end of the conduit 6 may terminate outside of the burner body in a suitable location, as in an open cap 10, where a plentiful supply of air may be obtained.

The burner is provided with a gasifying pipe 11 connected therewith in any suitable manner so that it passes through the area that is heated by the flame when the same is in operation, the end or tip 11′ of said pipe being arranged to project into the cap 10 and being disposed in alignment with the fuel conduit 6 and forming a tip from which a jet of fuel may be delivered into the conduit 6.

The burner is also provided with a plurality of circular outlets 12 disposed in the top and side portions of the burner body in which outlets may be placed burner tips of any well known make.

In the operation of my burner the fuel will be gasified in its travel through the pipe 11 and will issue from the tip 11′ as a jet of gas which will be directed across the gap in the cap 10 and into the conduit pipe 6 after the fashion common to Bunsen burners.

If for any reason the oil is turned on too quickly in priming the burner or the flame is extinguished while the burner is in operation the liquid fuel instead of gas will be jetted into the pipe 6 and, unless the pipe 6 is provided with means for disposing of this liquid fuel, the same will be ignited in the burner body and burn with smoke and soot that tends to clog up the burner tip.

If the fuel is turned on in my burner before the pipe 11 is heated sufficiently to gasify the same, liquid fuel will be emitted from the tip 11′ into the well 8 and will flow rearwardly along the pipe 6 and out into the ash pit of the stove or furnace in which the burner is disposed or into any receptacle that may be provided for catching the same thus avoiding burning the liquid fuel in a non-gaseous state within the burner body.

The foregoing description and accompanying drawings clearly disclose what I now consider a preferred embodiment of my invention, but, it will be understood that this disclosure is merely illustrative and that such changes in the construction of the burner may be resorted to as are within the scope and spirit of the invention.

What I claim is:

1. In a fuel inlet means for an oil burner the combination with an oil burner body, of a fuel inlet conduit open at the outer end and arranged to extend into said burner body in upwardly inclined relation to the horizontal, and a T-fitting forming a well at the inner end of said conduit, said T-fitting having outlet openings located above the level of the highest point of the bottom of said conduit whereby liquid will not be discharged from said outlet opening but will flow by gravity outwardly through said conduit.

2. In a fluid fuel burner, a burner body, a fuel inlet pipe extending into said body and inclined upwardly relative to the horizontal the outer end of said inlet pipe being open, means for delivering a jet of fuel into the outer end of said inlet pipe, and a horizontally arranged T-fitting on the inner end of said fuel inlet pipe, the ends of said T-fitting being partially closed by segmental webs that extend across the bottoms of the same and form, within said T-fitting, a well from which liquid will flow outwardly through said inlet pipe before it overflows said webs.

3. In a fluid fuel burner, a burner body, a fuel inlet conduit longitudinally disposed within said body, an oil collecting well disposed at the inner end of said inlet conduit above the bottom of said burner body, the enclosing walls of said well extending laterally from said inlet conduit and being of such height as to cause a return flow of ungasified fluid, that may collect therein, into said conduit and out to its point of delivery.

In witness whereof, I hereunto subscribe my name this 15th day of June, 1927.

PETER JOHNSON.